Aug. 11, 1964   F. M. BRINKMEYER ETAL   3,143,814
SCRAPERS
Filed Feb. 23, 1962   2 Sheets-Sheet 1
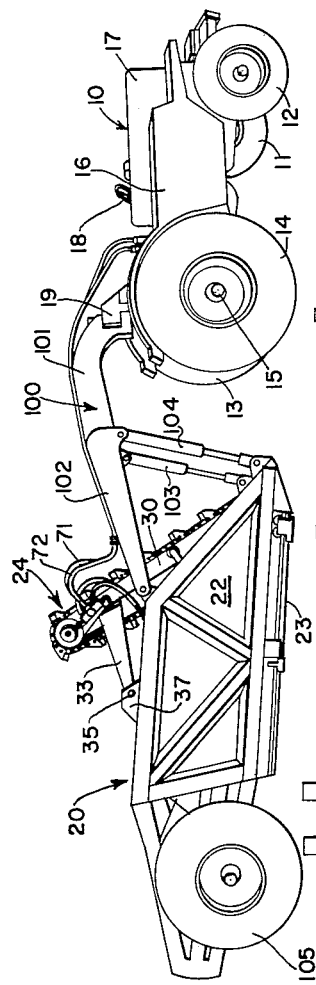
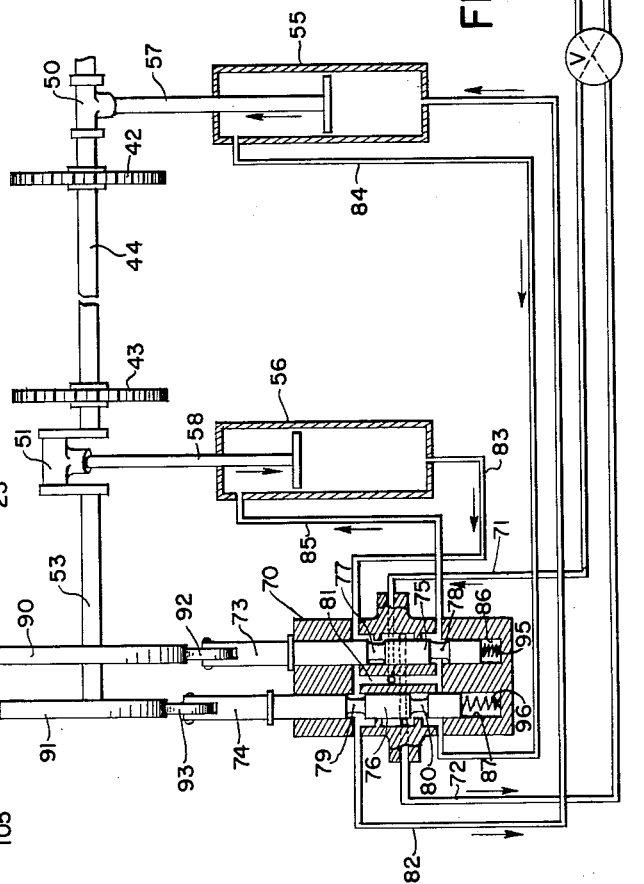
INVENTORS
FRANCIS M. BRINKMEYER &
JOHN H. CREIGHTON
BY William A. Murray
ATTORNEY Aug. 11, 1964       F. M. BRINKMEYER ETAL       3,143,814
                          SCRAPERS Filed Feb. 23, 1962                        2 Sheets-Sheet 2

INVENTORS
FRANCIS M. BRINKMEYER &
JOHN H. CREIGHTON
BY William A. Murray
ATTORNEY

United States Patent Office 3,143,814
Patented Aug. 11, 1964

3,143,814
SCRAPERS
Francis M. Brinkmeyer, Rock Island, Ill., and John H. Creighton, Davenport, Iowa, assignors to Deere & Company, Moline, Ill., a corporation of Delaware
Filed Feb. 23, 1962, Ser. No. 175,219
8 Claims. (Cl. 37—8)

This invention relates to an earth moving piece of equipment of the scraper variety that operates to both dig material and to transport material in a bowl. Still more particularly this invention relates to a means for driving an elevator positioned at the forward open end of the bowl that operates to feed material rearwardly into the bowl.

One of the more conventional carry-type scrapers presently in use includes a mobile fore-and-aft extending material-carrying box or bowl having a forwardly positioned cutting edge. Normally the bowl is open at its forward end so that material may pass over the cutting edge into the rear portion of the bowl. The bowl is composed of transversely spaced side walls interconnected at their lower edges by a horizontally disposed floor. The forward end of the bowl is supported on the rear portion of the tractor by means of a beam structure having a pair of fore-and-aft extending and transversely spaced apart leg beams pivotally mounted at their rear ends to the sides of the bowl and interconnected at their forward ends by a cross beam. Projecting forwardly from the cross beam is an integral rigid beam adapted to be mounted on a universal type hitch on the tractor. The vertical position of the forward cutting edge as well as the bowl is normally controlled by hydraulic units extending between the beam structure and the bowl. Also conventional in this type of scraper is a forwardly positioned undershot conveyor or elevator which is laterally disposed across the open forward end of the bowl and cooperates with the material passing over the cutting edge to aid in moving the material rearwardly into the bowl. The elevator is provided with mounting structure permitting a floating action of the elevator over the dirt or material entering the bowl so that damage cannot be done to the elevator or cutting edge upon a large stone or other foreign object being contacted by the scraper. Normally there is a mechanical type linkage or drive from the tractor to the elevator which is automatically adjustable to compensate for the floating movement of the elevator relative to the bowl. This drive must also be adaptable to accommodate both vertical and horizontal movement of the bowl relative to the tractor. Consequently the drive itself is rather complicated and in many instances creates many undesirable features. Also, such a drive is both expensive to manufacture and to maintain.

With the above in mind, it is the primary object of the present invention to provide an hydraulic drive for the elevator that is self-contained on the elevator except for the hydraulic hoses extending to the tractor which may be adequately protected by the beam structure and the framework of the elevator.

Specifically it is proposed to provide a main drive-shaft at the upper end of the elevator having eccentric connections at opposite ends. A pair of hydraulic motors connect to and extend between the eccentric connections and the frame of the elevator. Upon each complete cycle of the hydraulic motors, the drive shaft will have one complete rotation. The eccentric connections as well as the hydraulic motors are out of phase with one another so as to permit a relatively even distribution of load on the tractor hydraulic system.

It is also an object of the present invention to provide a pair of valves for the respective hydraulic motors controlled by cam followers. Mounted on the main drive shaft of the elevator are a pair of cams contacting the cam followers so as to operate the valves and reverse the stroke of the hydraulic motors at precisely the right time.

Other objects and advantages of the invention will become apparent to those skilled in the art as the nature of the invention is better understood from the following description and as shown in the accompanying drawings.

FIG. 1 is a side perspective view of a tractor and scraper utilizing the structure of the present invention.

FIG. 4 is a schematic view of the structure of the present invention.

Figure 2:
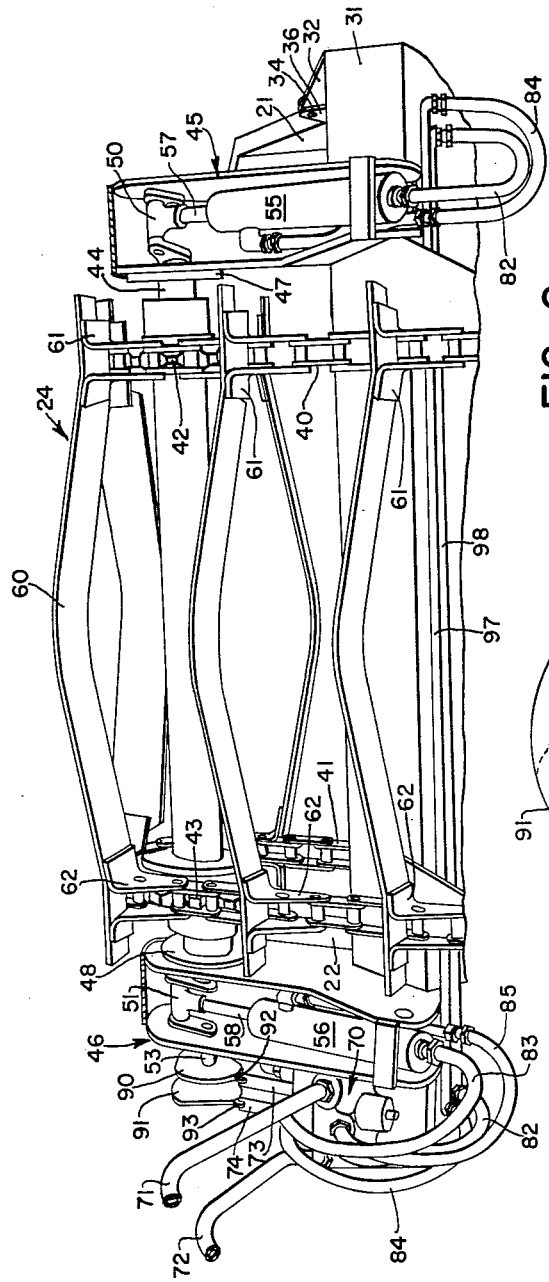
FIG. 2 is a front perspective view of the upper portion of the elevator and showing the structure of the present invention.
Figure 3:
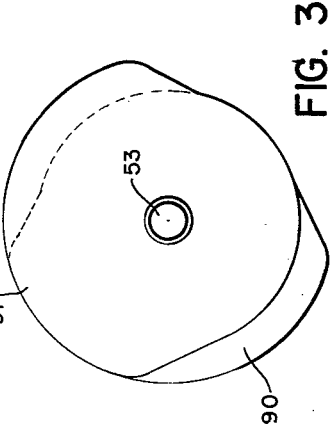
FIG. 3 is a side view of the cams used to control the strokes of the hydraulic motors.

The tractor 10 has a pair of front steerable wheels 11, 12 and a pair of rear traction wheels 13, 14 carried on a transverse rear axle structure 15. The tractor 10 includes an elongated tractor body 16 with a forwardly disposed engine or main power source mounted under a hood 17. To one side of the engine hood or housing 17 is an operator's station, indicated only partially by the steering wheel 18. Supported by and formed above the tractor axle 15 is structure defining a universal hitch 19 for connection to a trailing type scraper implement indicated in its entirety by reference numeral 20. The scraper is composed of the material container or bowl having left- and right-hand upright sides 21, 22 interconnected at their lower edges by a floor structure shown only partially in FIG. 1 and at 23. The bowl is open at its forward end except for an upwardly inclined elevator 24 extending across the open front of the bowl. As is conventional, there is a cutting edge along the front transverse edge of the bowl and the elevator operates in a manner so that the material passing over the edge is elevated or conveyed rearwardly into the rear section of the bowl.

The elevator 24 is composed of an elongated inclined main frame 30 including an upper transverse beam structure 31 having rearwardly projecting arms 32, 33 pivotally connected at 34, 35 to upwardly projecting bracket lugs 36, 37 respectively on the upper edges of the left- and right-hand sides 21, 22 respectively. As will be readily apparent from viewing FIG. 1, the entire elevator 24 has a floating relation to the bowl and will move both upwardly and longitudinally to accommodate the material passing into the bowl.

The conveying mechanism on the elevator is composed of a pair of longitudinally extending and continuous chains 40, 41 mounted over idler sprockets, not shown, at the lower end of the elevator, and upper drive sprockets 42, 43 carried on a main drive shaft 44, the latter extending across the upper end of the elevator. The shaft 44 is journaled on suitable bracket structures 45, 46 rigid with and extending upwardly and rearwardly from the transverse beam 31. Suitable journal plates, such as at 47, 48, are provided for supporting the shaft 44 on the bracket structures 45, 46. The shaft 44 has a pair of eccentric connections or throws 50, 51 at opposite ends thereof, the latter being asymmetric out of phase with one another. Outwardly of the right eccentric throw or connection 51 is a shaft extension 53.

A pair of hydraulic motors in the form of conventional type hydraulic cylinders 55, 56 is pivotally mounted on the bracket supports 45, 46 and extends upwardly and rearwardly from a point adjacent the transverse beam 31 to the eccentric connections 50, 51. Piston rods 57, 58 of the cylinders 55, 56 are connected to the respective eccentric connections 50, 51. The bracket structures 45, 46 are composed of a pair of transversely spaced apart plates and the cylinders 55, 56 are normally disposed between the respective plates so that the latter may offer protection from the material being moved by the elevator. The cylinders 55, 56 and their respective pistons 57, 58 are of the conventional alternating stroke type and are of such length that a complete cycle or advance and return of the rams or piston 57, 58 will cause a complete revolution of the shaft 44.

The elevator 24 is also of conventional design, the chains 40, 41 being interconnected by transverse flight positions 60 which are slightly V-shaped and are connected to the respective chains 40, 41 by bracket structures 61, 62 respectively.

Referring now to FIG. 4 and the schematic view of the operation of the hydraulic system, there is provided a pump P on the tractor feeding fluid into a hydraulic valve block, indicated in its entirety by the reference numeral 70, the line or inlet feeding from the pump into the block 70 being indicated by the numeral 71. A return line 72 returns the fluid to the reservoir R on the tractor. The valve block 70 carries a pair of identical valve spools 73, 74 having central enlarged portions 75, 76 separating pairs of lands 77, 78 and 79, 80 respectively. As may be seen from viewing FIG. 4, the inlet line 71 feeds into a receiving area 81 in the block 70 which has openings into cavities 86, 87 for the spools 73, 74, there being two spaced apart ports for each cavity. Fluid lines 82, 83 lead from the cavities 86, 87 to the large ends of the cylinders 55, 56. Similarly a pair of fluid conduits 84, 85 extend from the cavities 87, 86 to the ram ends of the respective cylinders 55, 56.

When the spool valves 73, 74 are in a position as shown in FIG. 4, it becomes apparent that fluid will pass from the pump P into the fluid receiving area 81 from whence it will pass through the cavities 86, 87 and into the conduit lines 85, 82. This will cause the piston rod 57 to move its return stroke. Similarly, the lands 77 and 80 will be in position to pass fluid from the lines 83, 84 into the return conduit 72 to be returned to the reservoir on the tractor. A reversal of position of the spool valves 73, 74 will, of course, reverse the strokes of the piston or rams 57, 58.

On the end of the shaft extension 53 is a pair of identical cam plates 90, 91 supported on the shaft extension 53 at 90° out of phase with one another. The cam plates 90, 91 engage followers 92, 93 on the ends of the respective spool valves 73, 74. The outer periphery of the cam plates 90, 91 are shaped to cause the spool valves 73, 74 to reverse their positions at approximately 180° intervals of rotation of the shaft extension 53. Springs 95, 96 are positioned in the cavities 86, 87 and against the ends of the spool valves 73, 74 so as to bias or maintain the followers 92, 93 in engaged positions with the respective cam plates 90, 91.

A reversing valve V is provided in the inlet and outlet lines 71, 72 downstream from the pump P. The purpose of the valve V is to provide manual adjustment to supply high pressure fluid from the pump into the outlet line 72 and a connection from the line 71 to the reservoir. Normally the elevator will operate in the manner previously described. However, at times it is desirable to reverse the direction of movement of the conveyor, for example, when it is desired to remove a large foreign object wedged between the flight conveyor and sprockets. At this time the valve V may be adjusted to cause reversing.

In actual construction, there are, of course, fittings which interconnect flexible hoses to the various conduits and cylinders described above. For example, there is provided a pair of intermediate pipes 97, 98 interconnecting the flexible conduits 82, 84. The pipes 97, 98 are fixed to the under side of the beam 31 and are for the most part protected by the beam 31.

The scraper 20 is connected to the hitch device 19 so that the entire implement may move vertically as well as laterally. The hitch connection is in the form of a Y-shaped beam structure 100 having a gooseneck forward section 101 directly and articulately connected to the hitch 19 and a pair of leg portions, one being shown at 102, extending rearwardly for connection to the upper edges of the sides 21, 22. The latter side beams are interconnected to the lower forward edges of the side walls 21, 22 by means of a pair of hydraulic cylinders 103, 104 which may be extended and retracted for purpose of raising and lowering the entire bowl about its rear wheels shown at 105. This latter construction is of course conventional but is here restated for purposes of clearly indicating the various relationships that exist between the tractor 10 and the scraper implement 20 and particularly the relationship of the various moving parts. It becomes apparent that not only does the scraper 20 move relative to the beam support 100, but also that the beam support moves relative to the tractor 10. Also, it should be recognized, as stated above, that the entire elevator 24 will float or move relative to the scraper bowl. Consequently it becomes rather apparent that by the use of the hydraulic flexible fluid lines 71, 72 which extend to the hydraulic cylinders 55, 56 there is a very simple connection to the elevator and the means for operating or driving the elevator. Being flexible, the hoses 71, 72 automatically compensate for and accommodate any movement between the tractor, beam 100, scraper 20 and elevator 24.

While only one form of the invention has been shown, it should be recognized that other forms and variations will occur to those skilled in the art. Therefore, while the present disclosure is made in concise and detailed manner for the purpose of clearly and concisely illustrating the principles of the invention, it should be understood there is no intention to limit or narrow the invention beyond the concept set forth in the appended claims.

What is claimed is:

1. In a tractor implement assembly in which the tractor has an hydraulic system and an implement hitch and the implement is a material scraper connectible to the hitch and having a bowl with a forward transverse cutting edge and a flight type elevator having an elevator frame and extending from a forward lower end adjacent the cutting edge to an upper rear end, the improvement comprising: a transverse elevator drive shaft extending across the upper end of the elevator and having an eccentric portion at each end thereof, one of the eccentric portions being in substantial 90° advance of the other; a pair of hydraulic motors having advance and return strokes supported on the frame and connected to the eccentric portions of the drive shaft and effective upon operation to rotate the shaft; a pair of valves for operating the hydraulic motors and including cam follower means; a flexible fluid conduit connection between the hydraulic system on the tractor and valves; and a pair of cams connected to the shaft and engageable with the follower means to effect an advance and return stroke of each motor upon each rotation of the shaft.

2. In a tractor implement assembly in which the tractor has an hydraulic system and an implement hitch and the implement is a material scraper connectible to the hitch and having a bowl with a forward transverse cutting edge and a flight type elevator having an elevator frame and extending from a forward lower end adjacent the cutting edge to an upper rear end, the improvement comprising: a transverse elevator drive shaft extending across the upper end of the elevator and having an eccentric portion at each end thereof, one of the eccentric portions being in advance of less than 180° relative to the other; a pair of hydraulic motors having advance and return strokes supported on the frame and connected to the eccentric portions of the drive shaft and effective upon operation to rotate the shaft; valve means for operating the hydraulic motors and including cam follower means; a flexible fluid conduit connection between the hydraulic system on the tractor and the valve means; and cam means connected to the shaft and engageable with the follower means to effect an advance and return stroke of each motor upon each rotation of the shaft.

3. In a tractor implement assembly in which the tractor has an hydraulic system and an implement hitch and the implement is a material scraper connectible to the hitch and having a bowl with a forward transverse cutting edge and a flight type elevator having an elevator frame and extending from a forward lower end adjacent the cutting edge to an upper rear end, the improvement comprising: a transverse elevator drive shaft extending across the upper end of the elevator and having a pair of eccentric portions, one of the eccentric portions being in advance of less than 180° relative to the other; a pair of hydraulic motors having advance and return strokes supported on the frame and connected to the eccentric portions of the drive shaft and effective upon operation to rotate the shaft; valve means for operating the hydraulic motors; a flexible fluid conduit connection between the hydraulic system on the tractor and the valve means; and valve operating means on the shaft associated with the valve means to effect an advance and return stroke of each motor upon each rotation of the shaft.

4. In a tractor implement assembly in which the tractor has an implement hitch and the implement is a material scrapper connectible to the hitch and having a bowl with a forward transverse cutting edge and a flight type elevator having an elevator frame and extending from a forward lower end adjacent the cutting edge to an upper rear end, the improvement comprising: an elevator drive shaft at the upper end of the elevator and having a plurality of eccentric portions on the shaft asymmetrically spaced relative to one another; a plurality of hydraulic motors having advance and return strokes supported on the frame and connected to the eccentric portions of the drive shaft and effective upon operation to rotate the shaft; valve means for operating the hydraulic motors; a fluid source connected to the valve means for operating the hydraulic motors; and valve operating means on the shaft associated with the valve means to effect an advance and return stroke of each motor upon each rotation of the shaft.

5. In a tractor implement assembly in which the tractor has an hydraulic system and an implement hitch and the implement is a material scraper with a hitch connection connected to the implement hitch having a bowl opening at its forward end with upwardly projecting oppositely disposed sides, and a flight type elevator across the forward open end of the bowl having an elevator frame pivotally mounted on the sides and extending from a forward lower end to an upper rear end, said frame further having a transverse beam spaced from the upper end, the improvement comprising: a transverse elevator drive shaft extending across the upper end of the elevator and having an eccentric portion at each end thereof, one of the eccentric portions being in advance of less than 180° relative to the other; a pair of hydraulic motors having advance and return strokes mounted on and extending from the transverse beam to the eccentric portions of the drive shaft and effective upon operation to rotate the shaft; a pair of valves on the transverse beam for operating the hydraulic motors and including a pair of spool valves with ends projecting toward the drive shaft; cam follower means on the ends; and a pair of cams connected to the shaft and engageable with the follower means to effect an advance and return stroke of each motor upon each rotation of the shaft.

6. In a tractor implement assembly in which the implement is a material scraper having a bowl with a forward cutting edge and a flight type elevator having an elevator frame and extending from a lower end adjacent the cutting edge to an upper end, the improvement comprising: an elevator drive shaft supported on the elevator frame having a plurality of eccentrics thereon angularly spaced relative to one another at least two of which are asymmetrical; a plurality of hydraulic motors having advance and return strokes supported on the frame and connected to the eccentrics and effective upon operation to rotate the shaft; valve means for operating the hydraulic motors; a fluid source connected to the valve means for operating the motors; and valve operating means operatively connected to the shaft and associated with the valve means to effect advance and return strokes of the motors upon rotation of the shaft.

7. In a tractor implement assembly in which the implement is a material scraper having a bowl with a forward cutting edge and a flight type elevator having an elevator frame and extending from a lower end adjacent the cutting edge to an upper end, the improvement comprising: an elevator drive shaft supported on the frame having a plurality of eccentrics thereon angularly spaced relative to one another at least two of which are asymmetrical; a plurality of hydraulic motors having advance and return strokes supported on the frame and connected to the eccentrics and effective upon operation to rotate the shaft; valve means for opertaing the hydraulic motors; a fluid source connected to the valve means for operating the motors; and valve operating means operatively connected to the shaft and associated with the valve means to effect advance and return strokes of the motors upon rotation of the shaft.

8. The invention defined in claim 7 further characterized by a reversing device adjustable to effect said valve mechanism to selectively drive the shaft in either direction.

References Cited in the file of this patent

UNITED STATES PATENTS

| 1,072,797 | Varcoe | Sept. 9, 1913 |
| 1,458,496 | Osborn | June 12, 1923 |
| 2,674,853 | Born | Apr. 13, 1954 |
| 2,928,381 | Macdonald | Mar. 15, 1960 |
| 2,994,976 | Hancock | Aug. 8, 1961 |